(12) United States Patent
Bayya et al.

(10) Patent No.: US 8,221,887 B2
(45) Date of Patent: Jul. 17, 2012

(54) LOW LOSS VISIBLE-IR TRANSMITTING GLASS-ALUMINUM OXYNITRIDE COMPOSITES AND PROCESS

(75) Inventors: Shyam S. Bayya, Ashburn, VA (US); Jasbinder S. Sanghera, Ashburn, VA (US); Guillermo Villalobos, Springfield, VA (US); Geoffrey Chin, Alexandria, VA (US); Ishwar D. Aggarwal, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/046,971

(22) Filed: Mar. 14, 2011

(65) Prior Publication Data

US 2011/0281122 A1    Nov. 17, 2011

Related U.S. Application Data

(62) Division of application No. 11/250,696, filed on Oct. 13, 2005, now Pat. No. 7,927,705.

(51) Int. Cl.
*B32B 9/00*    (2006.01)

(52) U.S. Cl. ........................................................ 428/426
(58) Field of Classification Search .................... 428/426
See application file for complete search history.

(56) References Cited

U.S. PATENT DOCUMENTS

| 4,983,555 | A | * | 1/1991 | Roy et al. ....................... 501/120 |
| 5,134,518 | A | * | 7/1992 | Letter ............................ 359/350 |
| 5,486,495 | A | * | 1/1996 | Jewell et al. ..................... 501/10 |
| 5,858,496 | A | * | 1/1999 | Fisher et al. ..................... 428/44 |
| 6,838,179 | B1 | * | 1/2005 | Legrand ......................... 428/432 |
| 2006/0011839 | A1 | * | 1/2006 | Zhan et al. ................. 250/338.1 |

* cited by examiner

*Primary Examiner* — Maria Veronica Ewald
*Assistant Examiner* — Daniel H Miller
(74) *Attorney, Agent, or Firm* — Amy Ressing; Suresh Koshy

(57) ABSTRACT

This invention pertains to a composite of AlON and a germanate glass, and to a process for bonding AlON to the glass. The composite includes AlON and glass bonded together and having transmission in the visible and mid-infrared wavelength region. The process includes the step of heating them together above the softening temperature of the glass, the composite having excellent, i.e., typically in excess of about 60%, transmission in the 0.4-5 wavelength region.

8 Claims, 4 Drawing Sheets

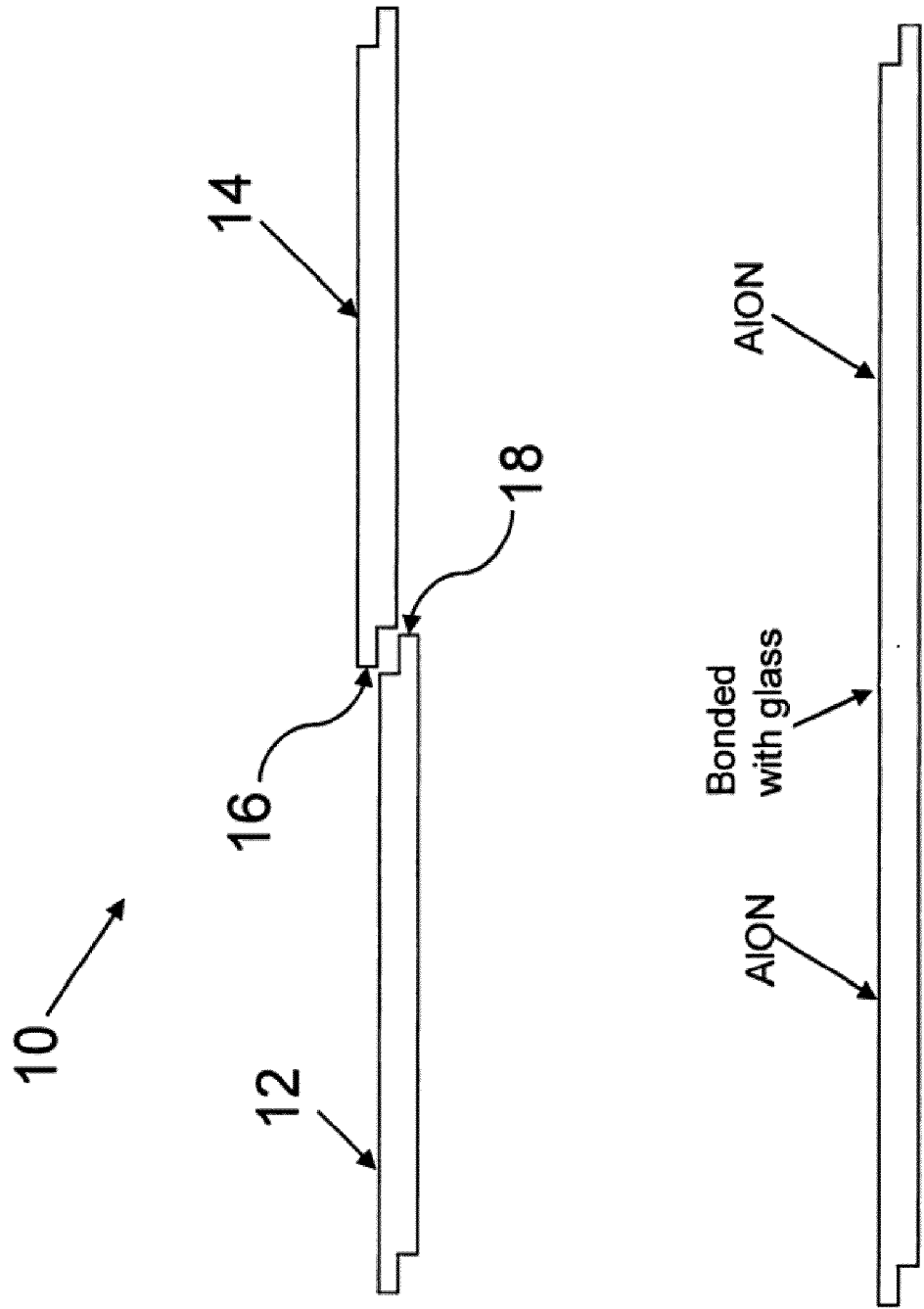

LOW LOSS VISIBLE-IR TRANSMITTING GLASS-ALUMINUM OXYNITRIDE COMPOSITES AND PROCESS

CROSS REFERENCE TO RELATED APPLICATIONS

The present application is a divisional of U.S. application Ser. No. 11/250,696 filed on 13 Oct. 2005 now U.S. Pat. No. 7,927,705, the entire contents of which are now incorporated by reference.

BACKGROUND OF THE INVENTION

1. Field of the Invention

This invention pertains to composites of germanate glass, particularly to barium gallogermanate (BGG) glass and aluminum oxynitride (AlON), and to a process for forming the composites by bonding the glass and the AlON.

2. Description of Related Art

Several sensors, operating in vis-IR region of 0.4-5.0 μm wavelength, currently use polycrystalline ZnS, which includes multi-spectral ZnS and CLEARTRAN®, hereinafter referred as zinc sulfide (ZnS), as a window material. ZnS is a very soft material, easily scratched and therefore not useful in rugged environments. It also has limited transmission in the visible wavelength region. Recently, new window materials have been developed, including BGG glass, Spinel and AlON, which are 3-10 times harder and 2-10 times stronger than ZnS.

Transparent AlON is a polycrystalline ceramic material, which is made by a cold isostatic pressing process followed by sintering and a hot isostatic pressing process. Large AlON windows are currently being developed for potential military applications, including sensor windows and domes on aircraft, reconnaissance windows on aircraft and unmanned airborne vehicles, missile domes and windshields for vehicles. AlON can also find many commercial applications, such as armor windows on buildings, banks, aircraft, cars, etc.

AlON is a very hard material and, consequently, its grinding and polishing costs are high. Applying a glass coating on the AlON substrate can significantly reduce its grinding and polishing costs. The index refraction of the glass and AlON can be matched to minimize reflection losses. The glass can be readily polished using traditional glass polishing techniques and therefore considerably reduce the polishing costs of AlON.

A new product is disclosed herein based on a germanate glass-AlON composite article. The new germanate glass is designed so that it can be easily bonded to an AlON substrate. The process for bonding the new glass to an AlON substrate is also disclosed. The bonded composite is very strong and withstands chemical and environmental abuse. The glass acts as an excellent dielectric layer in missile domes and window designs for applications requiring transmission in the visible, IR and microwave frequencies. For example, the composite can contain an electromagnetic interference (EMI) grid.

Many of the barium gallogermanate (BGG) glasses disclosed in the U.S. Pat. No. 5,305,414 cannot be used here because of the large coefficient of thermal expansion mismatch with AlON. Due to this large coefficient of thermal expansion mismatch, the prior art BGG glass delaminates from AlON substrates during thermal cycling. The BGG glass suitable herein bonds very well to AlON and does not delaminate.

OBJECTS AND SUMMARY OF THE INVENTION

An object of this invention is a composite of a barium gallogermanate glass, or any other suitable germanate glass, properly bonded to AlON.

Another object of this invention is a composite of a BGG glass and AlON that has excellent transmission in the wavelength range of 0.4-5 μm.

Another object of this invention is a composite of a BGG glass and AlON that has matched coefficient of thermal expansion and index of refraction of the glass and the AlON.

Another object of this invention is the procedure for bonding a softer BGG glass substrate and a harder AlON substrate to realize cost saving in polishing the composite.

Another object of this invention pertains to a process for bonding a BGG glass to AlON.

Another object of this invention pertains to the use of alumina to promote adhesion between BGG glass and AlON during fabrication of the resulting composite.

These and other objects of this invention can be achieved by bonding a BGG glass and AlON to form a composite thereof that can be polished on the glass side and thus save the polishing cost since the BGG glass is softer than AlON.

BRIEF DESCRIPTION OF THE DRAWINGS

FIG. 4 shows BGG glass-AlON composite joined by the glass between the AlON substrates.

DETAILED DESCRIPTION OF THE INVENTION

Figure 1:
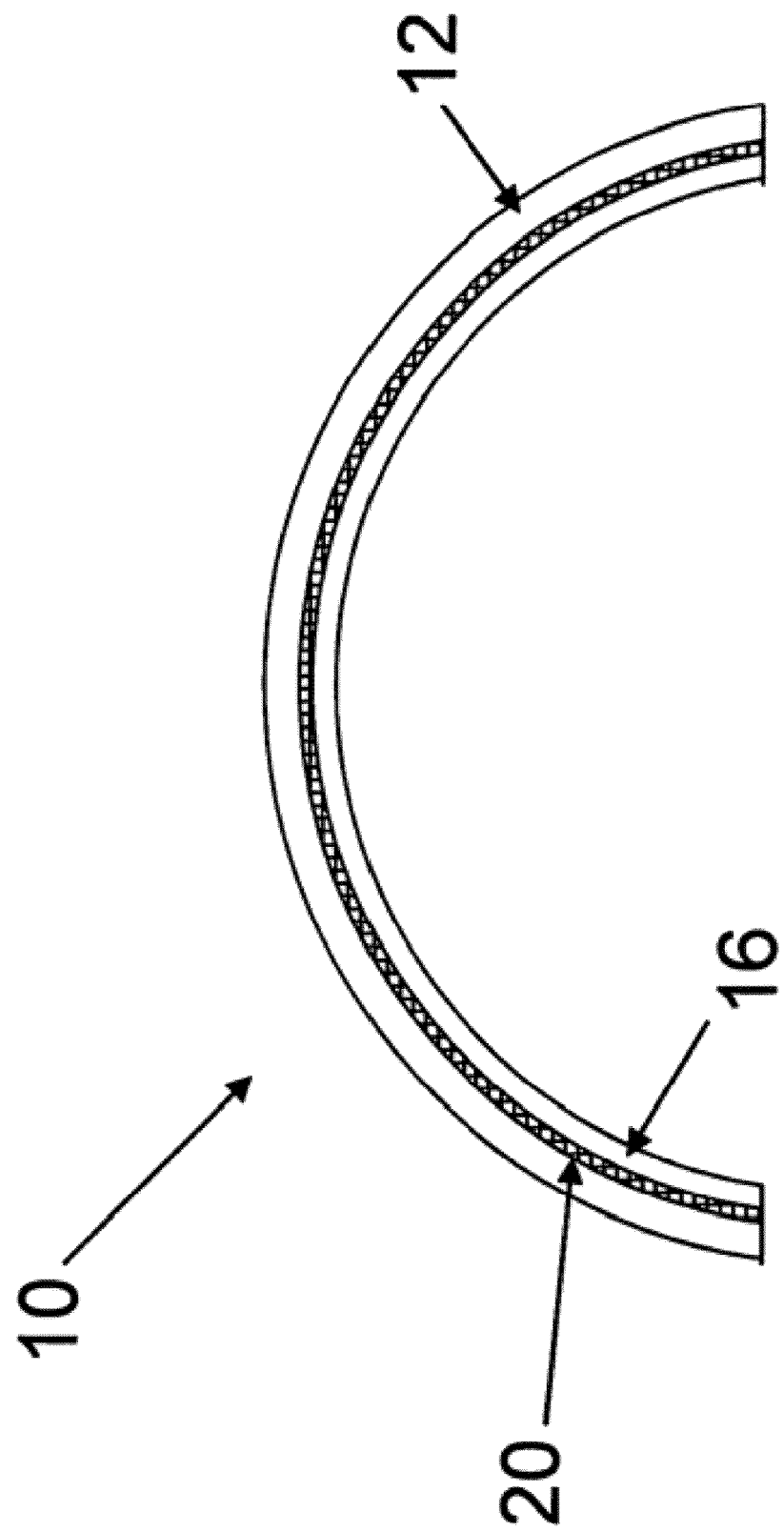
FIG. 1 is a schematic diagram of a composite of an AlON substrate and a BGG glass substrate in the shape of a dome.
Figure 2:
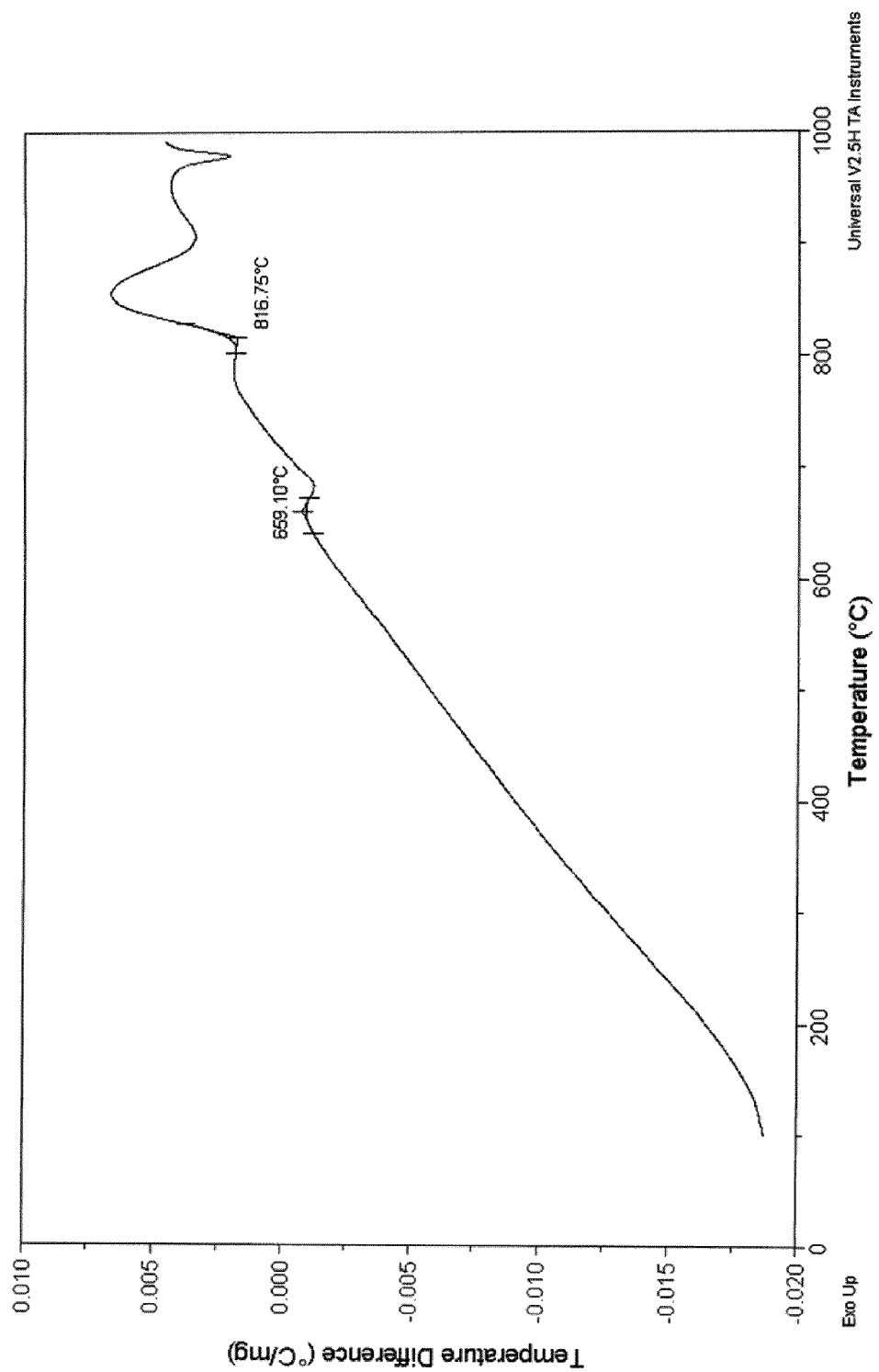
FIG. 2 is a differential thermal analysis trace of the BGG glass $15BaO/10Ga_2O_3/5Al_2O_3/70GaO_2$ showing glass transmission temperature ($T_g$) of 659° C., crystallization temperature ($T_x$) of 817° C. and glass stability temperature ($T_x-T_g$), or working range, of about 158° C.

This invention, in a preferred embodiment, is directed to a new BGG glass-AlON composite and to a process for making it which requires matched coefficient of thermal expansion, matched refractive index of AlON and BGG glass, wetting, and bonding. The glass does not have to be limited to BGG glass and may include other germanate glasses. By the term "germanate glass" it is meant that $GeO_2$ is the major glass former. The composite has excellent transmission in the 0.4-5 μm wavelength region that is suitable for various military and commercial visible and mid IR applications in lenses, optical devices, windows, domes and other geometric structures such as IRCM jam heads, visible IR windows, and the like. The BGG glass is designed with a coefficient of thermal expansion within $1\times10^{-6}$/K, and typically within $0.1\times10^{-6}$/K of the value for AlON and refractive index of the glass is within 0.1, and typically within 0.05 of AlON. Depending on application, thickness of AlON is typically 1-5, and more typically about 2 millimeters. The bond between the glass and the AlON is very stable and survives repeated thermal cycling without delaminating.

AlON has a defect cubic spinel crystal structure with chemical formula of $Al_{(64+x)/3}O_{32-x}N_x$ where x is 2-5. Nitrogen stabilizes the cubic spinel crystal structure over a wide composition range. With the optical and mechanical properties equivalent to single crystal sapphire, but fabricated using standard low-cost powder-processing techniques, AlON is showing a lot of promise as a high performance optical ceramic. The principle application of the AlON material is in missile domes and windows and bullet-proof transparent armor.

One of the presently used processes to make AlON begins with synthesis of optical quality AlON powder, followed by the formation of a green body using conventional forming techniques. A heat treatment process is then used to achieve 100% density. The fully dense ceramic is then cut, ground and polished into a finished product at a significantly lower cost than sapphire.

Some of the physical parameters of AlON and the BGG glass of composition of $15BaO-10Ga_2O_3-5Al_2O_3-70GeO_2$, are given in Table I, below:

TABLE I

|  | AlON | BGG Glass* |
|---|---|---|
| Density, g/cc | 3.69 | 4.5 |
| Hardness, kg/mm$^2$ | 1970 | 450 |
| Flexure Strength, MPa | 300 | 100 |
| Fracture Toughness | 1.4 | 0.7 |
| Refractive Index | 1.67 | 1.7 |
| Change in RI with Temperature | 13 | 8 |
| Coefficient of Thermal Expansion, ($\times 10^{-6}$/K) | 5.8 | 5.9 |
| Thermal Conductivity, W/mK | 11 | 1 |
| Transmission Window, μm | 0.3-5.0 | 0.4-5.0 |

The BGG glass of this invention, which can transmit light over visible and infrared regions of the light spectra, is characterized by a composition that contains three principal components, although, it should be understood that the glass composition described herein can contain more components than specified herein. The glass composition described herein contains germanium oxide ($GeO_2$); barium oxide (BaO); and gallium oxide ($Ga_2O_3$), or more correctly, gallium sesquioxide. It should be understood that other components, such as lanthanum oxide ($La_2O_3$), aluminum oxide ($Al_2O_3$) and indium oxide ($In_2O_3$), and other components such as ZnO, SrO, CaO, $ZrO_2$, $Y_2O_3$, $Gd_2O_3$, $Na_2O$, $K_2O$, $Rb_2O$, $Cs_2O$, and the like. can be included in the glass composition disclosed herein as long as they do not change the character of the glass.

To avoid crystallization, the mole ratio of barium oxide to gallium oxide should be about 2:1 to 1:1, preferably 1.5:1 to 1:1, and amount of germanium oxide should be about 50 to 95 mole percent, preferably 65 to 90 mole percent, based on the amount of germanium oxide, barium oxide and gallium oxide in the glass composition. If the glass composition is melted with no intention of processing into a fiber application, amount of germanium oxide in the glass composition can be as low as about 40 mole percent and the ratio of barium oxide to gallium oxide can be as high as about 4:1 and as low as about 1:1, on molar basis, in order to avoid crystallization in the glass, where crystallization is undesirable. About 0.1 to about 5 molar percent, preferable 0.5 to 4, gallium oxide in the glass composition can be replaced with a modifying agent selected from lanthanum oxide or indium oxide or aluminum oxide. This means that if there is 15 mole percent of gallium oxide in a glass composition, up to about 5 mole percent of it can be replaced with a modifying agent. Preferred modifying agent is aluminum oxide.

The preferred BGG glass composition is within the glass forming portion of the phase diagram and has the composition of, based on mole percent, $3-10Al_2O_3/10-20BaO/5-15Ga_2O_3/60-80GeO_2$, which is purified to contain less than 5 ppm OH— ions, and more preferably less than 1 ppm OH— ions. The alumina in the glass composition promotes adhesion between the BGG glass and AlON.

Presence of the modifying agent in the glass composition, described herein, imparts the advantage of increasing crystallization temperature. For instance, without any modifying agent, crystallization temperature of a BGG glass composition was 850° C. In the same composition with 2 mole percent gallium oxide replaced with lanthanum oxide, i.e., the preferred modifying agent, crystallization temperature was 903° C.

Glass transition temperatures of the glass compositions described herein vary from about 600° C. to about 700° C. For instance, at the molar ratio of barium oxide to gallium oxide of 1, $T_g$ of the glass composition containing 40 mole percent germanium oxide is slightly below 700° C. Also, at the molar ratio of barium oxide to gallium oxide of 1, the glass composition containing 65 mole percent germanium oxide has $T_g$ of about 667° C. The two glass compositions consisted of only barium oxide, gallium oxide and germanium oxide.

The way the glass is formed is by mixing high purity (99.999% plus) barium carbonate, gallium oxide and germanium oxide in a suitable amount for 2-4 hours; melting the batch thoroughly; and quenching it into a glass cullet. The cullet is then placed in a large platinum crucible, heated to a melting temperature, as described in Example 1, herein. The glass is then formed into the desired shape. The shaped glass is annealed to relieve any stresses.

Preparation of an AlON-BGG glass composite typically involves cutting the BGG glass to the desired AlON substrate size and shape. The glass to be bonded is then optionally polished, using, for example, 800 grit size abrasive paper, and cleaned, typically using isopropyl alcohol. Formation of the bonded composite is typically made in a vacuum or air atmosphere at temperature above $T_g$ but below $T_x$. A load can be used on the samples during the bonding process.

The glass is bonded to AlON substrate by heating them together above the softening temperature of the glass. At this bonding temperature, the glass softens and makes a good pore-free bond with essentially no entrapped air. The bonding procedure also works for AlON with electromagnetic interference (EMI) grids. The EMI grids are typically applied to windows requiring transmission in the visible-IR region with selective transmission/reflection of certain microwave frequencies. A slight vacuum can be used at times to assist in making a pore/bubble free joint between the two substrates. Once the glass is joined to the AlON substrate above the softening temperature of the glass, the glass is slowly cooled to the annealing temperature to release any thermal stresses followed by slow cooling to room temperature.

More specifically, depending on application, either the glass or the AlON substrates, or both, can be pre-treated before forming the composite. For instance, an electromagnetic interference grid can be applied to the AlON before forming the composite.

The resulting composite has an excellent joint that does not separate on repeated cycling and can easily be polished and handled without delamination. In preparing a particular type of a preferred embodiment of the invention, containing an EMI grid, for a missile dome, for example, the following steps are employed:

1. polishing inside surface of an AlON dome to promote bonding of EMI grid, unless the AlON dome has the desired surface smoothness, which is believed to be on the order of 10 μmy RMS or better, on the inner surface;

2. applying an EMI grid to inside surface of the AlON dome;

3. bonding a BGG glass dome to interior surface of the AlON dome having secured thereto the EMI grid;

4. polishing the interior surface of the BGG glass and outer surface of AlON dome to improve optical transmission; and 5. optionally applying anti-reflective (AR) coatings on the outer surface of AlON and/or the inner surface of the BGG glass in the composite dome.

The outer surface of the BGG glass dome need not be polished before bonding to the AlON dome, due to the fact that the glass will flow when heated above its softenint temperature. However, to facilitate bonding, the outer surface of the BGG glass dome can be polished to the desired smoothness before bonding to the AlON dome.

In another embodiment, a germanate glass can be used as a glue to facilitate bonding two AlON domes with or without an intermediate EMI grid.

In yet another embodiment, a lower softening temperature glass can be used as a glue to bond an AlON dome with a germanate glass dome with or without an intermediate EMI grid.

FIG. 1 is a schematic diagram of a composite dome 10 composed of AlON substrate 12 on the outside of the composite dome, bonded with an inner BGG glass 16 to the inner surface of the AlON substrate 12. Electromagnetic interference grid 20 is optionally disposed between AlON 12 and BGG glass 16. The grid is typically made of gold intersecting wires of about 1.2 µm in diameter with spacings of about 0.1 mm. The precise position and thickness of the grid depends on the optical requirements. During fabrication of the composite, load and/or pressure can be optionally used.

Another embodiment of forming AlON-BGG glass composite is shown in FIG. 4, where glass acts as a glue to bond AlON panels together. Composites of windows can be made by way of a half-lap joint. As shown in FIG. 4, a pair of AlON substrates or panels 12 and 14 are joined at their edges 16 and 18 by notching the edges to form exposed surfaces. At least one, and typically all, exposed surfaces are coated with a thin layer of a BGG glass and the edges are joined and then bonded by heating the glass and the AlON substrate edges to above the softening temperature of the glass. Following annealing and cooling to room temperature, a large composite is obtained by virtue of the strong bond between AlON substrates and the BGG glass. Matching coefficient of thermal expansion and refractive indices of the glass and AlON substrates can make the joint nearly imperceptible.

The bond between the glass and the AlON substrates was tested by thermal cycling between −50° C. and +150° C. The joint was found to be stable without any sign of failure or delamination. The glass/AlON composite has the rain and sand erosion resistance to withstand harsh environmental conditions.

For certain applications, such as ceramic armor, where the AlON composite has been developed as a strong candidate material in face shields, windshields, and the like, the glass coating/layer/substrate is utilized to keep polishing cost low. Glass possessing same or similar refractive index as AlON, will not introduce any noticeable reflection losses and at the same time, will significantly reduce the polishing costs by up to 50%. This is due to the principal fact that the glass can be polished using traditional glass polishing techniques.

The invention is further described by the following examples.

Example 1

This example demonstrates preparation of BGG glass of this invention.

Pursuant to this example, a 200 gram-batch of the approximate composition of $15 BaO-10Ga_2O_3-5Al_2O_3-70GeO_2$ was prepared by mixing 46.74 grams of $BaCO_3$, 29.6 grams of $Ga_2O_3$, 8.05 grams of $Al_2O_3$ and 115.61 grams of $GeO_2$. The glass batch was mixed for 30 minutes and then transferred to a platinum crucible. The platinum crucible, containing the batch material, was placed in a pre-melting furnace preheated to 1350° C. The batch material was left in the furnace to melt for 10 minutes and then quenched in air to make a cullet. The cullet was then transferred to another crucible that was loaded into a sealed furnace with a controlled atmosphere. The furnace was heated to 1300° C. under $Ar/O_2$ atmosphere. The glass was bubbled with 80/20 mol ratio $Ar/O_2$ mixture for 9 hours to remove water. After 9 hours of bubbling, the bubbling tube was pulled out of the melt, with the $Ar/O_2$ gasses still flowing over the melt. The melt was left at 1300° C. for about another 3 hours to fine and was then quenched in the sealed furnace and allowed to cool to below the glass transition temperature of 659° C. The cooled glass was then taken out of the crucible and annealed. Annealing was performed by placing the sample in an annealing oven at 690° C. for 2 hours and then was slowly cooled to room temperature at 1° C. Barium chloride, in amount of about 5% in the batch, can also be used to remove OH— ions to less than 1 ppm.

Example 2

This example demonstrates joining a BGG glass substrate to an AlON substrate.

Figure 3:
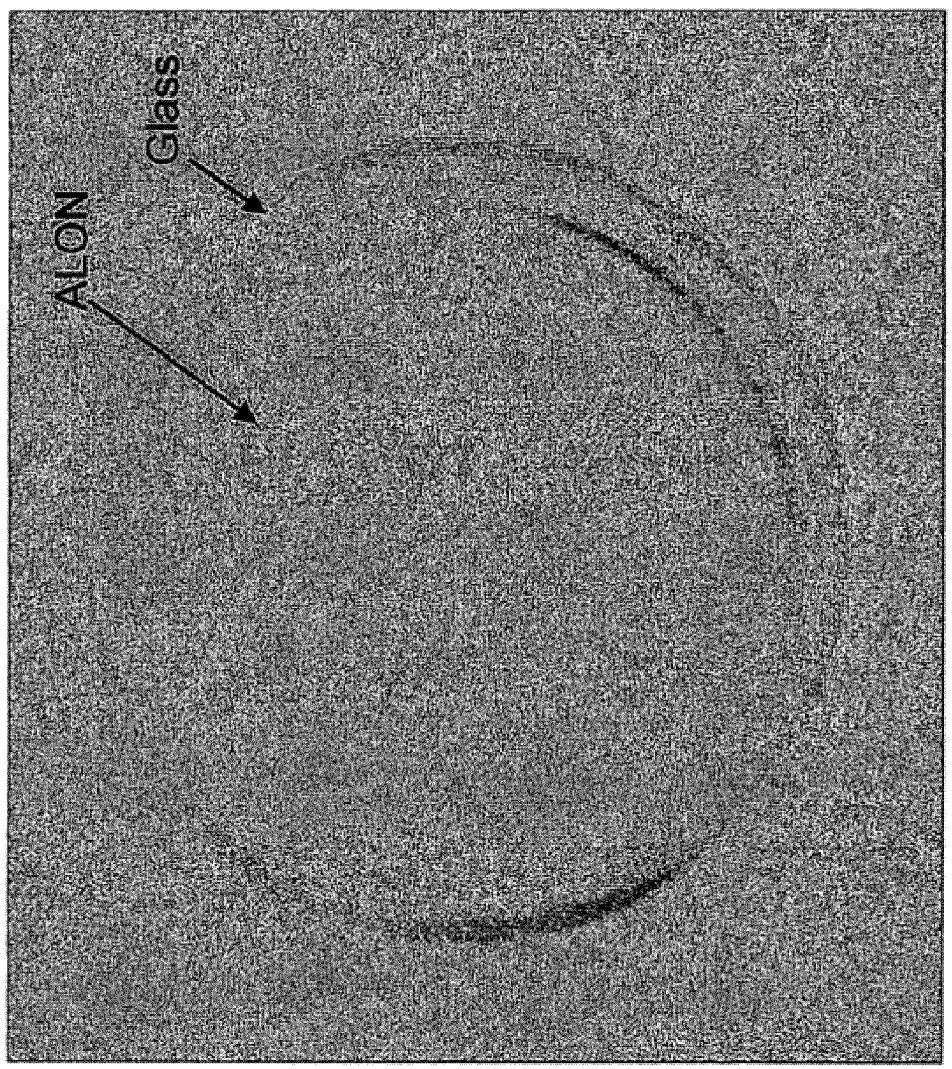
FIG. 3 is a picture showing excellent transmission of the BGG glass and the AlON composite window, as discussed in Example 3.

Glass of $12.5BaO-2.5BaCl_2-10Ga_2O_3-5Al_2O_3-70GeO_2$ composition, was obtained by the procedure described in Example 1, was cut into a 1"-diameter disc of 1.5 mm thickness. The glass was polished on the inner surface, using a final 800 grit paper. The glass and the AlON substrates were cleaned using isopropyl alcohol and then placed in direct contact under a mild vacuum of less than 1 Torr and under a load to obtain a pressure of about 100 psi during the bonding, i.e., heat treatment process. The samples were heated together from room temperature to 760° C. at a heating rate of 5° C. per minute. The samples were held at 760° C. for 1 hour and then cooled to 680° C. at a cooling rate of 5° C. per minute. The samples were then held at 680° C. for 6 hours for annealing followed by slow cooling at a rate of 0.1° C. per minute down to room temperature. The product was a composite of the BGG and the AlON substrates shown in FIG. 3.

Example 3

A polished AlON dome of dimensions 1.69 inches outside radius, 1.56 inches inner radius with a dome thickness of 0.13 inches and dome height of 1.54 inches was obtained. BGG glass dome was made by using a glass melting process described in Example 1, above, and cast into dome shape and annealed at 680° C. The glass dome was ground and polished to the dimensions of 1.56 inches outer diameter, 1.52 inches inner diameter with a thickness of about 0.04 inches and dome height of 1.41 inches. The outer surface of the glass dome and inner surface of the AlON dome were cleaned in isopropyl alcohol. The BGG glass dome was fully placed inside the AlON dome to make full contact between outer surface of the BGG dome and the inner surface of the AlON dome. The domes were heated together using heating cycle described in Example 2, above, to bond and anneal the BGG and the AlON domes. A BGG-AlON composite dome was obtained with a very strong bond in between. The bonded dome was repeatedly cycled between −50° C. and +150° C.

and after the test, the bonded composite dome indicated no sign of fracture or stresses or entrapped air.

Example 4

This example is similar to Example 3, above, with the exception that an EMI grid was applied on the inside surface of the polished AlON dome before bonding it with the BGG glass dome.

Example 5

This example is similar to the one described in Example 3, above, with the exception that during the entire bonding process, a vacuum of 1 Torr was used.

Example 6

This example is similar to Example 5. The bonded composite dome from Example 5, above, was placed in a hot isostatic press (HIP) and heated to 750° C. at 5° C./min. At 750° C., an isostatic pressure of 5,000 psi was applied for 15 minutes while the sample was maintained at 750° C. After 15 minutes at 750° C., the isostatic pressure was released. The sample was cooled at 5° C./minute to 680° C. and held for 3 hours for annealing. The sample was then cooled to room temperature at 0.1° C./minute. The bonded composite dome had no entrapped air pockets.

Example 7

This example is similar to Example 6, above, with the exception that an EMI grid was on the inside surface of AlON dome before it was bonded to the BGG glass dome, as used in Example 6.

While presently preferred embodiments have been shown of the novel composite and process for making it, and of the several modifications discussed, persons skilled in this art will readily appreciate the various additional changes and modifications can be made without departing from the spirit of the invention as defined and differentiated by the following claims.

What is claimed:

1. The process of bonding at least two articles, at least one of the articles that is bonded is AlON, that includes the step of applying a suitable germanate glass to at least one of the articles, joining the articles together, heating the newly joined surfaces of the articles to above the softening temperature of the glass, and bonding the articles to each other.

2. The process of claim 1 including the step of applying a vacuum during the bonding of the ALON and the glass.

3. The process of claim 2 including the step of applying load during bonding of the ALON and the glass.

4. The process of claim 3 including the step of applying a hot isostatic pressure to the bonded articles in order to eliminate any trapped air.

5. The process of claim 3 wherein composition of the glass, in mol percent, is 10-20 BaO/5-15 $Ga_2O_3$/3-10 $Al_2O_3$/60-80 $GeO_2$.

6. The process of claim 1 including the steps of polishing the inner surface of the AlON article, applying an electromagnetic interference grid to the polished inner glass surface of the AlON article, bonding a the germanate glass to the polished AlON article, and polishing inner surface of the glass and the outer surface of the AlON article and wherein said bonding step includes the step of heating the ALON article and the glass together above the glass softening temperature.

7. The process of claim 6 including the step of matching coefficient of thermal expansion of the AlON and the germanate glass within $0.1 \times 10^{-6}$/K and refractive index thereof to within 0.05.

8. The process of claim 7 including the steps of removing $OH^-$ from the glass to 1 ppm or below and applying anti-reflective coating to the outside surface of the AlON article and the inside surface of the germanate glass.

* * * * *